United States Patent
Ledingham et al.

(10) Patent No.: US 7,263,518 B2
(45) Date of Patent: Aug. 28, 2007

(54) DATABASE ARCHITECTURE FOR AN AIR TRAFFIC INFORMATION SYSTEM

(75) Inventors: Robert Ledingham, Manotick (CA); Keith Penny, Orleans (CA); Roman Zak, Edmonton (CA); Jeff Zanin, Burlington (CA); Howard Aikins, Monroe, WA (US)

(73) Assignee: Nav Canada, Ottawa (CA)

( * ) Notice: Subject to any disclaimer, the term of this patent is extended or adjusted under 35 U.S.C. 154(b) by 354 days.

(21) Appl. No.: 10/698,668

(22) Filed: Oct. 31, 2003
(Under 37 CFR 1.47)

(65) Prior Publication Data
US 2005/0080794 A1    Apr. 14, 2005

(30) Foreign Application Priority Data
Oct. 10, 2003    (CA) .................................. 2444827

(51) Int. Cl.
*G06F 7/00*    (2006.01)
(52) U.S. Cl. ........................................... 707/3; 707/102
(58) Field of Classification Search ................ 707/1–4, 707/10, 100, 101, 102
See application file for complete search history.

(56) References Cited

U.S. PATENT DOCUMENTS

| | | | |
|---|---|---|---|
| 6,430,602 B1 * | 8/2002 | Kay et al. ....................... 707/3 |
| 6,721,705 B2 * | 4/2004 | Kurganov et al. ......... 704/270.1 |
| 6,850,913 B2 * | 2/2005 | Feik ............................... 707/3 |
| 6,868,426 B1 * | 3/2005 | Mankoff .................... 707/104.1 |
| 6,990,468 B1 * | 1/2006 | Berson et al. ................. 705/52 |
| 7,039,034 B2 * | 5/2006 | Dick et al. ................... 370/338 |
| 7,051,199 B1 * | 5/2006 | Berson et al. .............. 713/150 |
| 2002/0193997 A1 * | 12/2002 | Fitzpatrick et al. ......... 704/270 |
| 2004/0044674 A1 * | 3/2004 | Mohammadioun et al. . 707/100 |
| 2004/0185882 A1 * | 9/2004 | Gecht et al. ................ 455/466 |

* cited by examiner

*Primary Examiner*—Wilson Lee
(74) *Attorney, Agent, or Firm*—Blakely, Sokoloff, Taylor & Zafman LLP

(57) ABSTRACT

A database architecture for an air traffic information display system includes a data manager including a first interface, a first database server connected to the data manager via the first interface, a firewall connected to the first database server; and a second database server connected to the first database server via the firewall and including a stored procedure for copying data from the first database. The second database server is used for computations based upon the data transactions pulled from the first database server. Thereby off-loading the first database server so that it can be more responsive to the data manager with respect to current changes. The firewall between the two servers prevents the data in the first server from being corrupted by users of the system.

37 Claims, 9 Drawing Sheets

```
EXCDS DSC Stored Procedures

Name & Parameters                                    Description                                              Default Parameter
─────────────────                                    ───────────                                              ─────────────────
dsc_statecount                                       Count of rows by state (*)                               Current values
dsc_tables                                           Row and page counts for EXCDS tables (#)                 Current values
dsc_trace1 <acid>                                    Selected FDE items (*)                                   Current values
dsc_trace2 <acid>[,<from>[,<to>]]                    Transactions for specified acid & period                 Last 4 hours
dsc_trace3 <from>[,<to>]                             All transactions for specified period                    Last hour
dsc_trace4 <machine>[,<from>[,<to>]]                 Tower activity for specified machine & period            Last 4 hours
dsc_trace5 <acid>,[<from>[,<to>]]                    Tower activity for specified acid & period               Last 4 hours
dsc_movement                                         Arrival and departure movements from adapted airports (#)
           [<acid>                                   - acid                                                   All
           [,<type>                                  - aircraft type                                          All
           [,<dept>                                  - departure airport                                      All
           [,<dest>                                  - destination airport                                    All
           [,<atdstart>                              - actual time of departure start time span               All
           [,<atdend>                                - actual time of departure end time span                 All
           [,<atastart>                              - actual time of arrival start time span                 All
           [,<ataend>                                - actual time of arrival end time span                   All
           [,<deprwy>                                - departure runway                                       All
           [,<arrrwy>                                - arrival runway                                         All
           [,<rules>                                 - flight rules                                           All
           [,<magic>]]]]]]]]]]]                      - magic bits                                             All <acid> may be specified in full (no quotes necessary) e.g. ACA123 or using wildcards in quotes e.g. "ACA_".
The underscore (_) represents any character and the percent sign (%) represents any string.

Parameters may be specified by position (as shown above) or by name prefixed by the @ symbol, e.g. @deprwy=33R Dates (<from> and <to>) are specified in quotes in the form "mon dd yyyy hh:mm", e.g. "Feb 1 1999 00:00".

(*) - these Stored Procedures are present on the EXCDS SQL Server only
(#) - these Stored Procedures are present on the Gateway SQL server only
```

Fig. 9

DATABASE ARCHITECTURE FOR AN AIR TRAFFIC INFORMATION SYSTEM

FIELD OF THE INVENTION

The present invention relates to database architectures, and is particularly with concerned databases for air traffic information systems.

BACKGROUND OF THE INVENTION

Modem air traffic control systems are built in conformance to rigid software development standards where safety and reliability are the key design drivers. At the same time the demand for accessible operational data through access to the system is an another requirement. Meeting these two divergent requirements require unique and novel solutions.

One design feature that system providers have endeavored to build into modem air traffic control systems is the ability to record every system or user action and store this data into a database. This feature leads to greater reliability in that system or user errors can be captured and analyzed and the system modified to prevent such errors from occurring. As well, there is usually commercial value in such data in that it provides a direct record of traffic movements and can be used for extracting statistics, billing data, or be used for training purposes. Timely access to this data is therefore necessary for both business and safety purposes.

In order both enhance both the perception and actual security, air traffic control systems usually are isolated from connectivity with outside systems. Physical access is usually very strictly controlled through secure login procedures in locked or carded facilities where actions are both monitored and audited.

The problem that the system is attempting to solve is that the system security requirements are in direct conflict with the access requirements; both of which appear to be quite valid.

Historically the operational data transfer has been completed by manual means requiring lengthy and error prone procedures. The manual method has limitations in that it is usually not performed in a frequent or timely manner nor can it handle large amounts of data. A design that would permit secure, safe data transfer without human intervention on a timed basis that was robust and secure is a crucial requirement in the unique area of the design of air traffic control systems.

SUMMARY OF THE INVENTION

An object of the present invention is to provide an improved database for air traffic information systems.

This invention solves unique problems encountered in the field of air traffic control systems. Accordingly, the present invention provides the infrastructure to automate the interface between the EXCDS, an air traffic control operational system and business systems.

The database architecture and data transfer mechanism is constructed in such a way so as to provide reliability in the way of overall system fault tolerance. In the case of failure of any of the system components on the business system side, the air traffic control portion would continue to operate without significant degradation.

Similarly a failure of components on the air traffic control portion of the system would not degrade the business side nor would critical data be lost, a key business system requirement.

In addition, the real-time database architecture is tuned to transfer data in a performance-related and secure manner without undue constraints or complex table relationships.

In accordance with an aspect of the present invention there is provided A database architecture for an air traffic information display system comprising: a data manager including a first interface; a first database server connected to the data manager via the first interface; a firewall connected to the first database server; and a second database server connected to the first database server via the firewall and including a stored procedure for copying data from the first database server.

In accordance with an aspect of the present invention there is provided a method of storing air traffic information comprising: receiving a data update request; changing the data in accordance with the request; storing the changed data in a first database server; and copying the changed data to a second database server separated from the first database server by a firewall.

An advantage of the present invention is security and availability of the data to the data manager by off-loading data to a second server.

BRIEF DESCRIPTION OF THE DRAWINGS

The present invention will be further understood from the following detailed description with reference to the drawings in which:

FIG. 9 illustrates a screen shot of dsc_help output.

DETAILED DESCRIPTION OF THE PREFERRED EMBODIMENT

Figure 1:
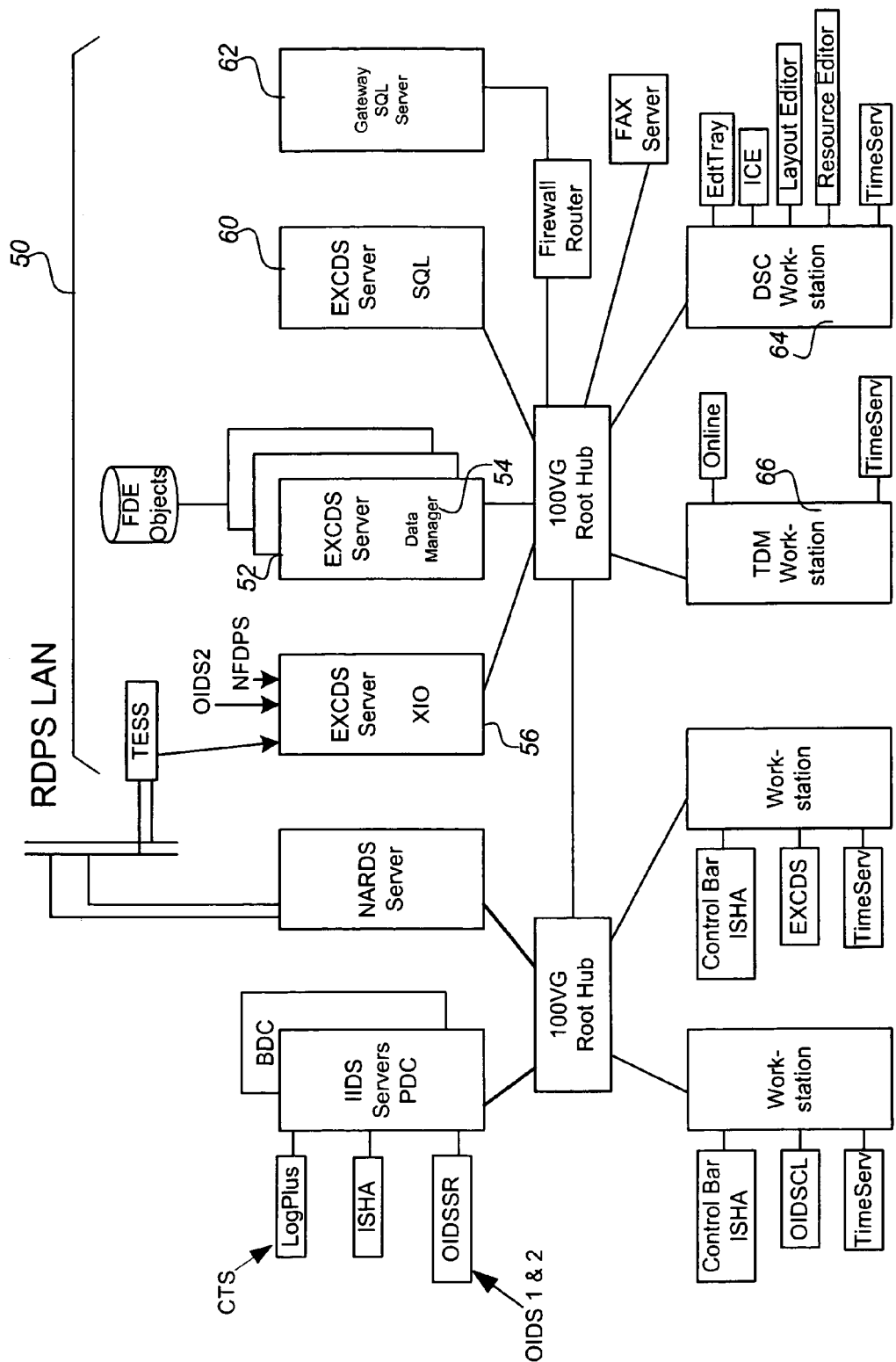
FIG. 1 illustrates in a block diagram an interactive information display system (IIDS) with additional components of an extended computer display system (EXCDS)

Referring to FIG. 1 there is illustrated in a block diagram an interactive information display system (IIDS) with additional components of an extended computer display system (EXCDS) in accordance with an embodiment of the present invention.

The EXCDS 50 operates on the IIDS Operational Network. IIDS PDC 16a and BDC 16b handle system security and permissions. EXCDS servers are member servers on the IIDS Operational Network. By sharing the IIDS Operational Network with IIDS, EXCDS data can be presented on an IIDS workstation without any additional hardware.

The operational EXCDS 50 includes a server 52 with:

A Data Manager (DM) 54

Alternate Data Manager (Alternate DM) not shown in FIG. 1

An EXCDS XIO (eXternal Input/Output) server 56

A FAX Server 58

An EXCDS SQL Server (XSS) 60

A gateway SQL server (GSS) 62

DSC (Data Systems Coordinator) & TDM Workstations 64, 66.

FIG. 1 shows the EXCDS and IIDS components combined on the IIDS Operational Network. It should be noted that EXCDS database development is not done on the IIDS Operational Network, but on a DSC development/test LAN, which is not shown in FIG. 1.

Figure 2:
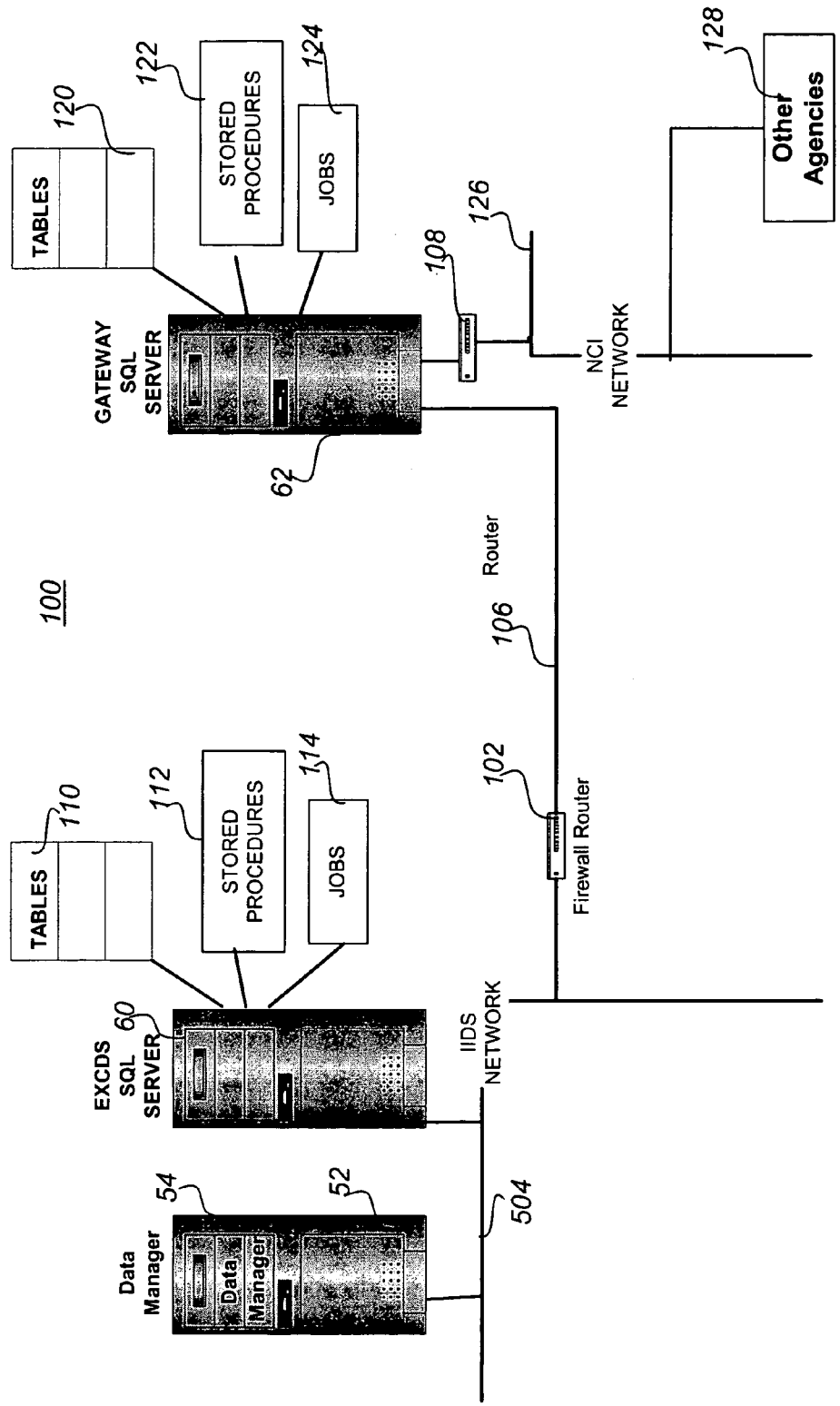
FIG. 2 illustrates the database subsystem of the EXCDS system of FIG. 1 in accordance with an embodiment of the present invention.

Referring to FIG. 2, there is illustrated the database subsystem of the EXCDS system. The database subsystem 100 including an EXCDS SQL Server (XSS) 60 and the Gateway SQL Server (GSS) 62. A router 102 configured as a firewall is located between the IIDS LAN 104 and the Nav Canada Intranet (NCI) 106. The Gateway SQL Server 62 is configured with dual network interface cards (NICs). The EXCDS SQL Server 60 does not subscribe to the DM 54, but uses ODBC to establish a connection with the DM 54 and to receive all of the FDE transactions.

The EXCDS SQL Server (XSS) 60 acts as data repository for the X3 Data Manager(s) (DM). All transactions, whether system, interface or user-initiated, are recorded in the database for future analysis and/or troubleshooting. In addition, the Database subsystem acts as a data snapshot, holding the latest operational and system data, should this be required.

The XSS 60 is configured as a non-Domain Controller NT SP6A Server with SQL Server V7.0 SP 1. The XSS 60 is connected to the regional IIDS domain, and participates in IIDS domain security. SQL authentication is carried out via the SQL System administrator logon.

The EXCDS SQL Server (XSS) 60:

Maintains two database tables 110: the FDE Table, and the FDE Transaction Table.

Receives the FDE transactions and saves them in the FDE Transaction Table.

Uses the transactions to keep its copy of the FDE Table up-to-date.

Maintains a transaction log that records everything that happens to an FDE, and logs certain system events.

Receives all FDE transactions in order to record changes and archive the data.

Will store approximately 5 megabytes of data per day.

The DM 54 writes all data modifications to an EXCDS SQL Server 60 as they occur. If a new piece of operational data is created, the DM 54 inserts it into the appropriate table. If changes are made to existing data as determined by the DM 54, an update to an existing row is made. The DM 54 does not delete rows. A SQL Server 60 scheduled task (called a Job in SQL Server) 114 periodically cleans out stale rows depending upon the last time that the data row was accessed. DM 54 uses an Open Database Connectivity (ODBC) connection to SQL Server 60 to accomplish these writes. If EXCDS SQL Server 60 is not responding, the DM 54 records the data temporarily on its hard disk until EXCDS SQL Server 60 becomes available. DM 54 then transfers this temporary data to EXCDS SQL Server 60.

Note: ODBC differs from the Publish/Subscribe method used between DM 54 and its clients, in that all transactions made by DM 54 are immediately sent to SQL Server 60, without any subscription considerations.

In order to make EXCDS data available to the unit and to outside users without impacting EXCDS operation, a connection to the local ACC's Administrative LAN 506 is necessary. This is accomplished through the use of a firewall router 502 and another SQL server called the Gateway SQL Server 62.

Gateway SQL server 62 receives regular updates from the EXCDS SQL server 60. These updates are accomplished using Stored Procedures 112 invoked from Jobs 114. The 'Transfer and movements Job' runs every 10 minutes, 23 hours per day. The Transfer and movements Job is suspended for one hour during a quiet period, while the server executes maintenance and deletes stale records jobs.

The SQL Server database 60 record provides the only operational activity log in the system, as there are no paper strips in the EXCDS environment in Tower or Terminal. This transaction record can be used for a number of purposes, such as:

Post-performance analysis and troubleshooting (EXCDS3 also has a playback capability)

Statistics record keeping

Flight billing

The SQL Server database provides the final point of recovery if both the Primary and Alternate DMs fail simultaneously.

Protection is required to prevent unauthorized access to the IIDS LAN 104 from the NCI 124, as well as unauthorized access to the NCI 124 from the IIDS LAN 104. To achieve that, the IIDS Firewall router 104 is set up with an access control list that allows only specific machines on either side to talk to each other. In fact, only SQL Server 60 and the IECS machine (for NCAMS) (not shown) on the IIDS LAN can talk to the IIDS Gateway machine 62 on the other side of the Firewall router and vice versa.

The IIDS Gateway machine 62 is installed with Microsoft SQL Server and is set up to pull data from the EXCDS SQL Server 60 every 10 minutes. An EXCDS Reporting Tool (XRT2) then queries this data that is local to the Gateway SQL Server 62. XRT2 formats the data as required.

Figure 3:
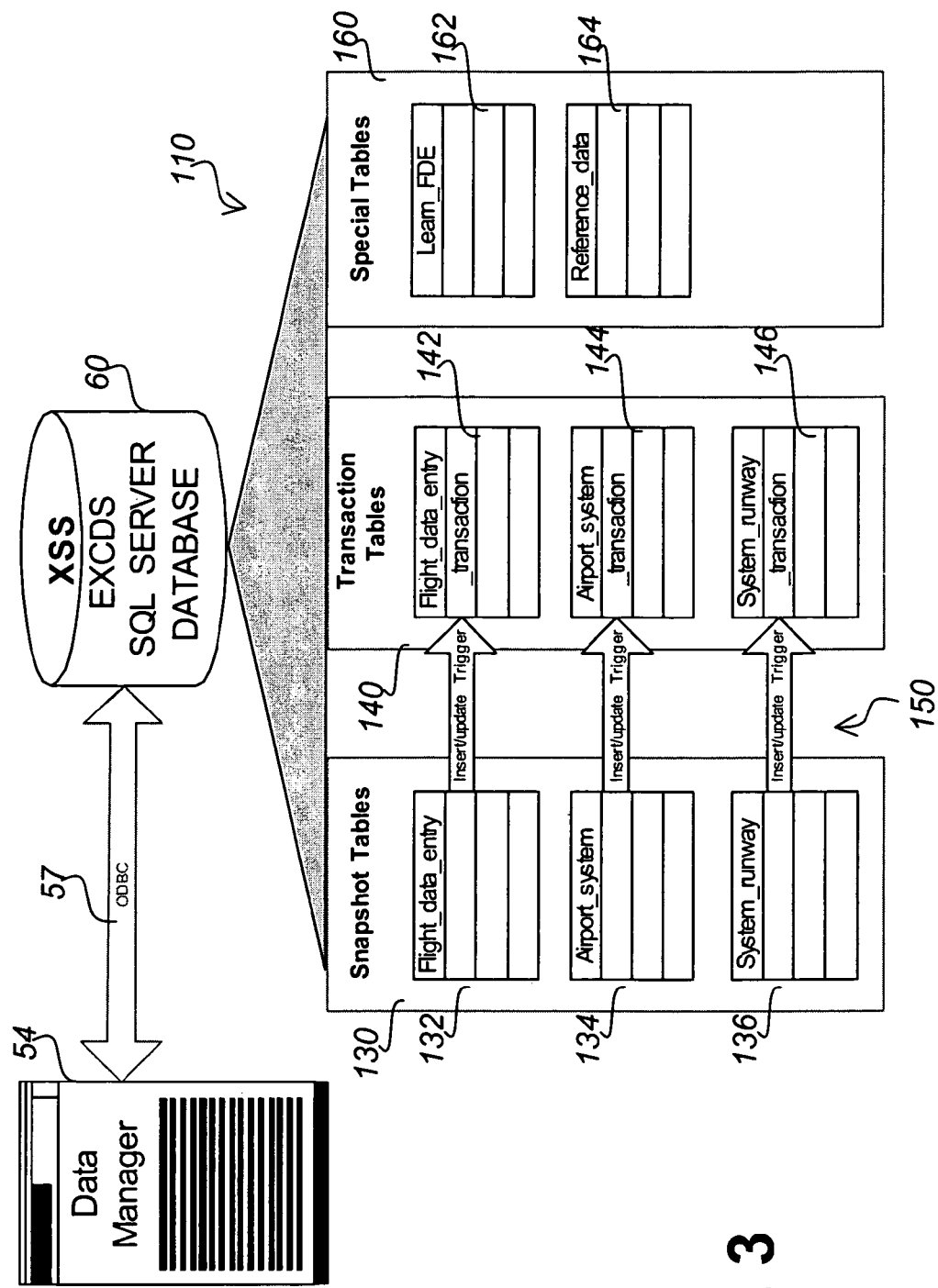
FIG. 3 illustrates how data is stored in SQL Server Tables separated into three categories: Snapshot, Transaction and Special Purpose in the database of FIG. 2.

EXCDS data is stored in SQL Server Tables 110 that can be separated into 3 categories: Snapshot, Transaction and Special Purpose, as shown in FIG. 3.

Operational X3 data is kept as a "snapshot" in three operational EXCDS SQL Server data tables. These tables are kept refreshed by the X3 DM through a single version 3.0 ODBC connection 57. If a new piece of operational data is created, the DM inserts it into the appropriate table. If changes are made to existing data (as determined by the DM), an update to an existing row is made. The DM does not delete rows. A SQL server job periodically cleans out stale rows, depending upon the last time that the data row was accessed. Snapshot tables 130 are used to record the instantaneous state of any FDE or System Data item. Any data updates in the DM 54 are sent immediately to the "snapshot" tables 130 via their ODBC connection 128. The three "snapshot" tables are:

FLIGHT_DATA_ENTRY TABLE 132

The Flight_data_entry (FDE) table 132 holds FDE data that is directly associated with particular flight plans. An example is Aircraft Identification or ACID. The primary key constraint of this table is the Current Flight Index (CFI) column, which is a unique system-wide FDE identifier. A clustered index on the CFI column is also enforced as part of being the primary key.

Airport_System Table 134

The Airport system (AS) table 134 holds System Data directly associated with a unique airport. An example of this type of data is wind speed and/or direction, tower release status, and local movement counts. The primary key constraint is the airport column. A clustered index is also present on this column.

System_Runway Table 136

The System_runway (SR) table 136 holds System Data associated with a unique runway at an airport. This table's data is the runway visual range (RVR) readings and lighting information received from the OIDS2 interface. The compound primary key constraints of the SR table 136 are the Airport and Runway columns, since neither is unique separately. A clustered index is also present on these columns. A foreign key is the airport column from the Airport system table. A dependency is required to link the airport data through which the RVR readings originate.

There are three transaction tables 140 populated respectively with update/insert triggers 150 that are attached to a corresponding one of the 3 "snapshot" tables 130. Any added rows, or changes occurring to existing rows in the "snapshot" tables 130, are recorded in time ordered sequence in the transaction tables 140. In this way, a complete time-stamped history for each flight and System Data item is kept in the SQL Server database 60, and can be accessed at any time.

The three transaction tables are:

Flight_Data_Entry_Transaction Table 142

The Flight_data_entry_transaction table 142 holds Flight Data Entry FDE) transaction data. Each new entry (row) in this table generates a unique, sequential number in a column called FDE_ID. The FDE_ID column uniquely identifies each transaction. The FDE Transaction Table has the same columns as the Flight_Data_Entry_Table 132 plus the FDE_ID field. The primary key constraint and clustered index is the FDE_ID column.

This table contains all of the transactions that have occurred to each FDE in the system. The FDE Transaction table 142 allows us to trace what has happened to any FDE. Typically, the search results would be sorted by time and workstation name, so that a chronological sequence of events could be seen for a particular workstation.

TABLE A

Elements of the Flight_Data_Entry and Flight_Data_Entry_Transaction Tables

| FDE Table and FDE | Type | Size |
|---|---|---|
| FDE_ID (Transaction Table Only) | integer | |
| ACID | varchar | 7 |
| ACKNOWLEDGED | char | 1 |
| ACTUAL_TIME_OF_ARRIVAL | datetime | 8 |
| ACTUAL_TIME_OF_DEPARTURE | datetime | 8 |
| ADJUSTED_DEPARTURE_FLOW_TIME | datetime | 8 |
| ADVISE_CUSTOMS | varchar | 7 |
| AIRCRAFT_TYPE | varchar | 10 |
| AIR_TO_GROUND_DATA_LINK | char | 1 |
| APPROVAL_REQUEST_TIME | datetime | 8 |
| ARRIVAL_RUNWAY | varchar | 4 |
| ARRIVAL_SEQUENCE | datetime | 8 |
| ASSIGNED_ALTITUDE | varchar | 11 |
| ATIS | varchar | 2 |
| ATTRIBUTES | varchar | 128 |

TABLE A-continued

Elements of the Flight_Data_Entry and Flight_Data_Entry_Transaction Tables

| FDE Table and FDE | Type | Size |
|---|---|---|
| BLINK_UNTIL | datetime | 8 |
| CFI | varchar | 20 |
| CFI_REVISION | varchar | 20 |
| CJS | varchar | 10 |
| CLEARANCE_LIMIT | varchar | 10 |
| COCKED_STRIP | char | 150 |
| DEPARTURE_AIRPORT | varchar | 4 |
| DEPARTURE_RUNWAY | varchar | 4 |
| DEPARTURE_SEQUENCE | datetime | 8 |
| DESTINATION_AIRPORT | varchar | 4 |
| DISPLAYED_ROUTE | varchar | 152 |
| EMERGENCY | char | 1 |
| EQUIPMENT | char | 1 |
| ESTIMATED_TIME_ENROUTE | varchar | 5 |
| ESTIMATED_TIME_OF_ARRIVAL | datetime | 8 |
| ESTIMATED_TIME_OF_DEPARTURE | datetime | 8 |
| FIX_FIELD_ROUTING | varchar | 234 |
| FLIGHT_CATEGORY | char | 2 |
| FLIGHT_PLANNED | char | 1 |
| FLIGHT_PLANNED_ALTITUDE | varchar | 11 |
| FLIGHT_PLANNED_SPEED | varchar | 5 |
| FLIGHT_RULES | char | 1 |
| FLOW_ASSIGNED_METER_FIX_TIME | datetime | 8 |
| FLOW_ASSIGNED_RUNWAY | varchar | 4 |
| FLOW_ASSIGNED_RUNWAY_TIME | datetime | 8 |
| FLOW_ESTIMATED_METER_FIX_TIME | datetime | 8 |
| FLOW_ESTIMATED_RUNWAY_TIME | datetime | 8 |
| FLOW_MODIFIER | char | 1 |
| FREQUENCY | varchar | 10 |
| GATE | varchar | 4 |
| GROUND_ROUTE | varchar | 152 |
| HEADING_DIRECTION | varchar | 4 |
| INTERSECTION | varchar | 4 |
| LANDING_CLEARANCE | char | 1 |
| LANGUAGE_OF_COMMUNICATION | char | 1 |
| LAST_STATE_CHANGE_TIME | datetime | 8 |
| LAST_UPDATE_MACHINE | varchar | 45 |
| LAST_UPDATE_TIME | datetime | 8 |
| LOCATION | varchar | 20 |
| MAGIC_BITS | varchar | 128 |
| MEDEVAC | char | 1 |
| MISSED_APPROACH | char | 1 |
| NFDPS_CFI | varchar | 5 |
| NUMBER_OF_AIRCRAFT | varchar | 10 |
| OVERFLIGHT | char | 1 |
| REMARKS | varchar | 80 |
| RID | varchar | 12 |
| ROUTE | varchar | 152 |
| SELECTIVE_CALLING_CODE | varchar | 4 |
| SID | varchar | 10 |
| SOULS_ON_BOARD | varchar | 4 |
| SPECIAL_FUNCTION_INDICATOR | varchar | 5 |
| STAR | varchar | 20 |
| STATE | varchar | 3 |
| STATISTICS_REFERENCE_CODE | char | 2 |
| STATUS_TYPE | varchar | 10 |
| TES_FIX_TIME | datetime | 8 |
| TES_RUNWAY_TIME | datetime | 8 |
| TOUCH_AND_GO | char | 1 |
| TOWER_RELEASED | char | 1 |
| TOWER_REMARKS | varchar | 80 |
| TRAINING | char | 1 |
| TRANSPONDER_CODE | varchar | 4 |
| VALIDATION_STATUS | char | 1 |

TABLE A-continued

Elements of the
Flight_Data_Entry and Flight_Data_Entry_Transaction
Tables

| FDE Table and FDE | Type | Size |
|---|---|---|
| VNAP | varchar | 10 |
| WAKE | char | 1 |
| WEIGHT | char | 1 |
| MIO_RESPONSE | varchar | 150 |

SYSTEM_RUNWAY_TRANSACTION TABLE 144

The System_runway_transaction table 144 holds system transaction data associated with a unique runway. The System_runway_ID column is an identity column, so that a new value is generated each time an insertion occurs, and each transaction can be identified uniquely. The primary key constraint and clustered index is the System_runway_ID column.

AIRPORT_SYSTEM_TRANSACTION TABLE 146

The Airport_system_transaction table 146 holds system transaction data. The System_ID column is an identity column, so that a new value is generated each time an insertion occurs, and each transaction can be identified uniquely. The primary key constraint and clustered index is the System_ID column.

The EXCDS SQL Server 60 also includes special purpose tables 160 used for other data. There are two special purpose tables:
Learn_FDE 162
Reference_data 164.

LEARN_FDE TABLE 162

The Learn_FDE table 162 holds FDE data and is used to support the EXCDS Learned FDE function. Requests from users govern the data with which it is populated, as well as the data that can be read from it.

REFERENCE_DATA TABLE 164

The Reference_data table 164 is provided for future usage. It is intended to store miscellaneous data.

Figure 4:
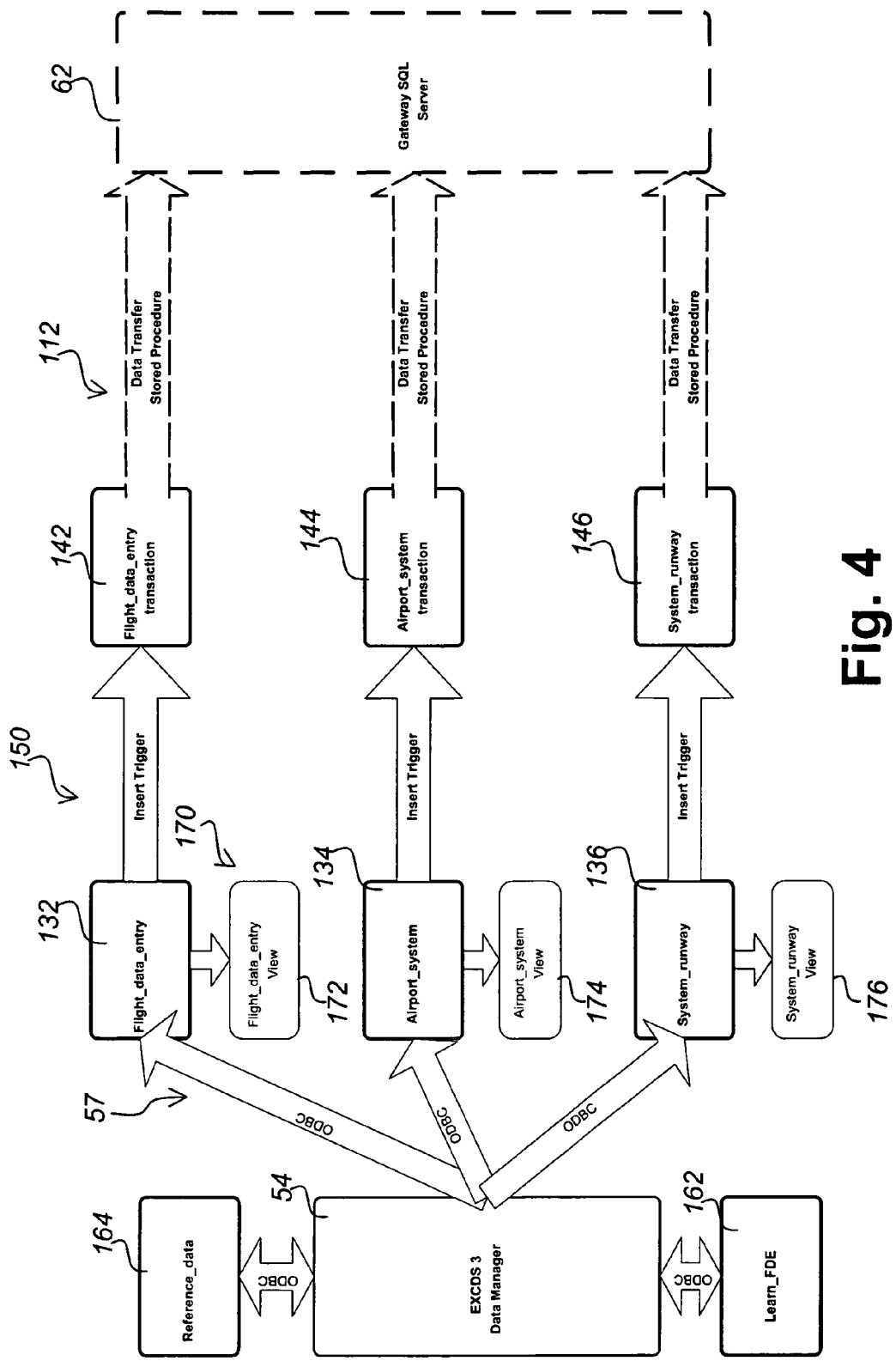
FIG. 4 illustrates in a functional block diagram, data movement from the data manager to the EXCDS SQL Server and the Gateway SQL Server.

Referring to FIG. 4, there is illustrated in a functional block diagram, data movement from the data manager to the EXCDS SQL Server and the Gateway SQL Server.

In operation, EXCDS DM 54 updates or inserts data into one of three snapshot tables 130 via ODBC connection 57. An associated trigger 150 on those snapshot tables populates a corresponding one of three transaction tables. Hence, as changes are made to the snapshot tables 130, additional rows are inserted into the transaction tables 140.

Data is eventually moved out of the IIDS domain 104 by a linked server routine 112 that is initiated on the GSS 62. The GSS 62 initiates the data "pull", so that if the GSS 62 ceases to operate, the XSS 60 continues to function. In this scenario, when the GSS 62 returns to service a short time later, the data transfer 112 begins following the last record read.

Stale data are removed from tables by an automated daily task. The automated task also checks the integrity linkages and allocations of the EXCDS database via SQL server diagnostic commands.

Views 170 are on the side and are kept updated with the current data in the snapshot tables.

There are seven stored procedures 112 in the XSS 60. These are detailed below:

sp_create_EXCDS_user
This stored procedure adds additional logins for the XSS, and adds the users to the EXCDS database. The procedure takes 2 varchar parameters:
user name to be added
password associated with the new user name.

This procedure is executed on an as needed basis.

sp_delete_EXCDS_stale_FDE
This stored procedure deletes stale FDEs from the FDE table 132, under the following conditions:
row was last accessed more than one day ago AND
FDE's state is Archived (AR), Deleted (DL), or Cancelled (CN).

This procedure takes no parameters and intended to be executed by a SQL Server scheduled job, rather than on an ad hoc basis.

sp_delete_stale_transaction
This stored procedure deletes stale FDEs from the FDE transaction table 542, under the following conditions:
row was last accessed more than fourteen days ago.

This procedure takes no parameters and is executed as a SQL Server scheduled job, rather than on an ad hoc basis.

sp_drop_EXCDS_user
This stored procedure simply deletes a user from the EXCDS database. As part of this procedure, it also deletes the login. The procedure takes the user name as a parameter and is intended for ad hoc use.

sp_EXCDS_connection_check
This stored procedure simply returns a literal value of 1 to verify that the EXCDS database is installed and available. The procedure takes no parameters, and is intended to be run by a SQL scheduled job.

sp_delete_stale_airport_transaction
This stored procedure deletes rows from the airport system transaction table 144 under the following conditions:
the row was last accessed more than fourteen days ago.
The procedure takes no parameters and is run by a SQL Server scheduled job.

sp_delete_stale_runway_transaction
This stored procedure deletes rows from the system runway transaction table 146 under the following conditions:
the row was last accessed more than fourteen days ago.

The procedure takes no parameters and is intended to be run by a SQL Server scheduled job.

Views 170 are used in the XSS 60 as a means of obtaining data without affecting the underlying table structure. The use of views also allows the underlying structure to evolve without affecting the data client using views. SQL server views are updated when data in the underlying table is updated.

There are three views 170 installed in the XSS 60. They are detailed below:

flight_data_entry_view
The flight_data_entry view 172 contains all the data in the flight_data_entry table 132.

airport_system_view

The airport_system view 174 contains all the data in the airport system table 134.

system_runway view

The system_runway view 176 contains all the data in the system_runway table 136.

There are two main purposes of scheduled tasks for the XSS 60:

Deleting Old Data: If data is not deleted, the XSS database will eventually fill up completely and cease to function.

Periodic Maintenance: The constant updating, inserting and deleting of rows requires that periodic maintenance be performed. This is much like the defragmentation process performed on hard disks.

XSS has one main automated task called "database delete stale data and maintenance". This is run everyday at 0900Z.

An SQL Server Agent performs one scheduled job in the XSS 60. This job includes seven steps that are performed periodically. The job is set up to fail if a previous step fails. Subsequent steps will also fail to run.

The seven steps are detailed below:

RUN "SP_DELETE_EXCDS_STALE_FDE"

This step runs the named stored procedure. It deletes stale data (data more than one day old) from the FDE table 132. This keeps the FDE table 132 trimmed to the minimum possible size, while still retaining the snapshot capability required by the X3 DM.

RUN "SP_DELETE_STALE_TRANSACTION"

This step runs the named stored procedure. It deletes stale data (data more than fourteen days old) from the FDET table 142. This keeps the FDET table 142 in check.

RUN "SP_DELETE_STALE_SYSTEM_RUNWAY_TRANSACTIONS"

This step runs the named stored procedure. It deletes stale data (more than fourteen days old) from the SRT table 146. This keeps the SRT table 146 in check.

RUN "SP_DELETE_STALE_AIRPORT_SYSTEM_TRANSACTIONS"

This step runs the named stored procedure. It deletes stale data (more than fourteen days old) from the AST table 144. This keeps the AST table 144 in check.

RUN DBCC CHECKDB EXCDS

This step runs the powerful SQL Server DBCC checkdb command on the entire EXCDS database. DBCC checkdb catches and repairs the widest possible set of database errors, including allocation or linkage errors, and validating integrity.

Run "Update Statistics" On All Operational Data Tables

This step recomputes all statistics on key values used for query optimization. SQL Server executes a query plan based upon distribution of data. If the statistics on key values are not kept up-to-date, the query plan may become out-of-date, which might result in much longer execution times. Statistics become out of date when a large percentage of data is inserted, updated or deleted.

Run Recompile All Triggers and Stored Procedures

The execution of triggers and stored procedures, like statistics, are based upon query plans. The query plans are based upon distribution of data when the server is first started, or when they are first compiled. In order to keep the query plans up-to-date, it is necessary to manually recompile these items when a large percentage of data is moved about on a daily basis.

The Gateway SQL Server (GSS) 62 pulls the operational data across from the XSS 60, performs some extraction tasks to create movements, and formats the data for use by data reporting programs. The GSS 62 is configured as a non-Domain Controller NT SP4 Server with SQL Server v7.0 SPI. The GSS 62 is connected to the NCI via a separate network card, and to the IIDS domain through a firewall router. The GSS 62 may be altered regionally by running ACC-specific scripts to support special reporting needs. The description herein is applicable to the generic reporting scheme only.

Figure 5:
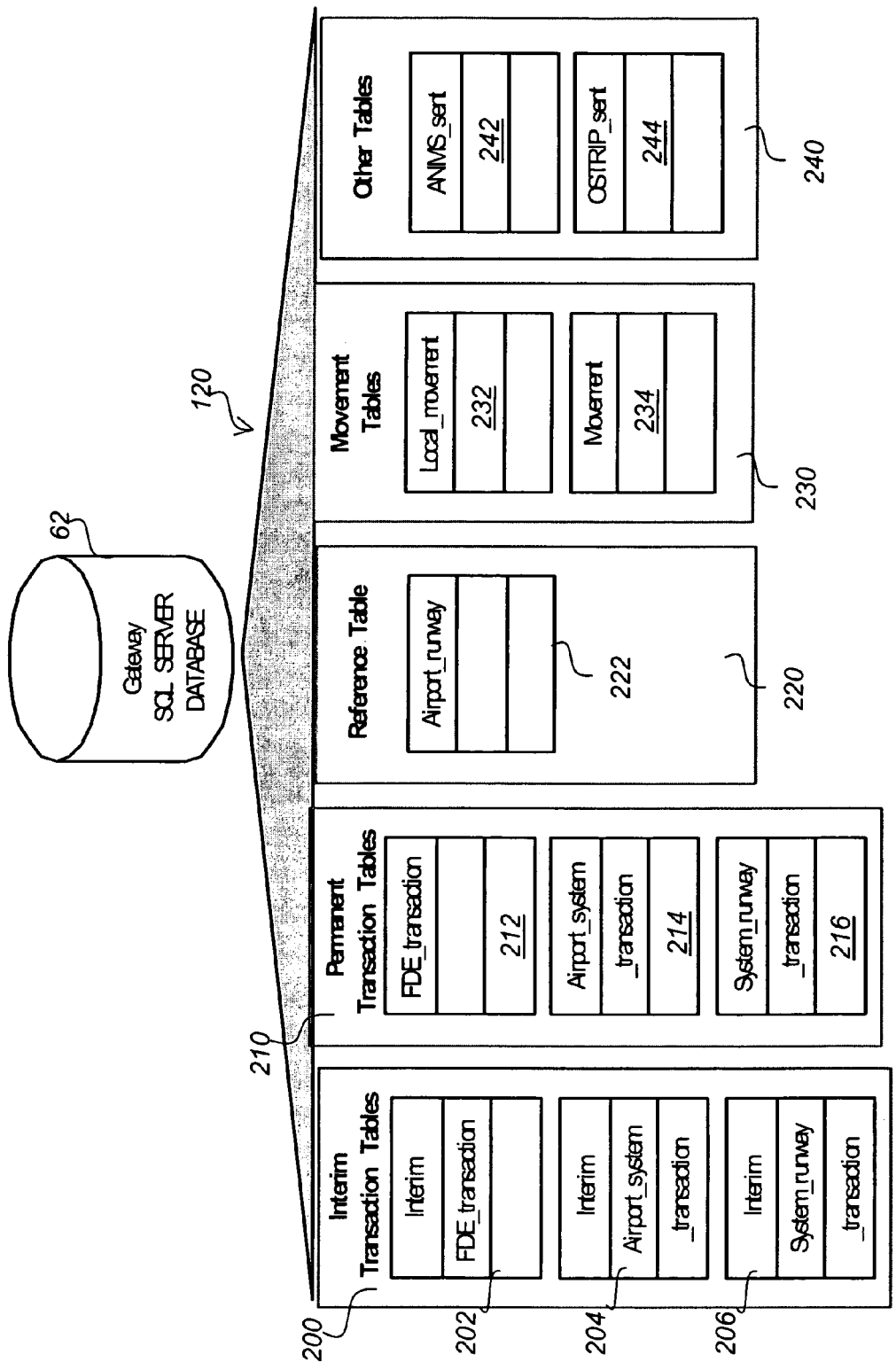
FIG. 5 illustrates how data is stored in Gateway SQL Server tables for the EXCDS system of FIG. 1.

Gateway SQL Server includes eleven tables, as shown in FIG. 5, configured to hold:

Temporary (interim) transaction data 200

Permanent transaction data 210

Reference data 220

Movement data 230

Other tables 240.

The DSC typically inspects, and selects data from, the Gateway SQL Server 62. This preserves the EXCDS SQL Server's 60 resources, so that they are used primarily in support of the DM 54 and Gateway SQL Server 62.

The transaction tables 200 and 210 and resident on the Gateway SQL Server 62 are identical to those on the EXCDS SQL Server 60 within the VSP update time (current operational setting is 10 minutes). The data is pulled from the EXCDS SQL Server 60 to the Gateway SQL Server 62, less the stale data timeout differences between the servers. This means that the data accessed from the Gateway SQL Server can be up to 10 minutes old.

There are three interim transaction tables 200 that receive the associated data from the EXCDS SQL Server 60 via a scheduled job:

Interim_fde_transaction table 202

Interim system_runway_transaction table 204; and

Interim_airport system_transaction table 206.

The interim transaction tables 200 are identical in structure to the transaction tables 140, and are used as temporary placeholders for the data as it is transferred from the EXCDS SQL Server 60 to the Gateway SQL Server 62.

They are involved in moving and temporarily storing the FDE and System Data, while processing it at the same time and are cleared before each data transfer from the EXCDS SQL Server 60.

The Interim_fde_transaction table 202 temporary holds FDE transaction data as transferred from EXCDS SQL Server 60 to Gateway SQL Server 62 via a scheduled task that runs every 10 (VSP) minutes.

The Interim_airport_system_transaction table 204 temporary holds airport system transaction data as transferred from EXCDS SQL Server 60 to Gateway SQL Server 62 via a scheduled task that runs every 10 (VSP) minutes.

The Interim_system runway_transaction table 206 temporary holds system runway transaction data as transferred from EXCDS SQL Server 60 to Gateway SQL Server 62 via a scheduled task that runs every 10 (VSP) minutes.

There are three permanent transaction tables 210 to receive the associated data from the EXCDS SQL Server 60 via a scheduled Job:

FDE_transaction table 212

System_runway_transaction table 214

Airport_system_transaction table 216.

The permanent transaction tables 200 hold the permanent FDE and system transaction data that is moved across from the EXCDS SQL Server 60. They mirror the function of the transaction tables 140 in the EXCDS SQL Server 60. One use for these tables is to reconstruct events for later investigative or statistical analysis. Within the update window, these tables hold the same data as on the EXCDS SQL Server 60.

The FDE_transaction table 212 holds permanent Flight Data Entry transaction data. It records what changed, who changed it, and when it was changed. It is identical to the Flight_data_entry_transaction table 142 on the EXCDS SQL Server 60, within the update time constraints.

The FDE_transaction table 212 on the Gateway SQL Server 62 contains all transactions for all FDEs in EXCDS 50. There is no direct connection between DM 54 and the Gateway SQL Server 62. Accordingly, the risk of impact to EXCDS is reduced when data is extracted from the Gateway SQL Server 62. This makes it the ideal candidate for data extraction activities that the DSC may be called upon to perform. To that end, a number of pre-compiled data extraction queries (Stored Procedures) have been prepared for the use of the DSC. These are included in all releases of EXCDS software.

The Airport system transaction table 214 holds permanent airport system transaction data such as changes in designated runways, changes in weather data, and local movement data.

The System_runway_transaction table 216 holds permanent system runway transaction data such as changes in RVR readings for designated runways.

The Reference data table 220 has only one table in this category and it is used during the processing stage.

The Airport_runway table 222 contains a listing of all runways at all adapted airports. The airport runway table 222 is used to reference runways during the processing of aircraft movements at adapted airports. This occurs at a "transfer and synthesize" step as an automated task.

The airport runway table includes only two columns that associate the airport and the runway.

The Movement Data Tables 230 hold a record of both local movements and movements for all adapted airports.

The Local_movement table 232 includes entries detailing what local movements occurred, at what airport, at what time. The data is synthesized from the airport system transactions. They are categorized in accordance with standard NCAMS local movements and are associated with the adaptable Veeder Root Counter functionality.

The Movement table 234 includes of aircraft movements that have been extracted from the FDE transaction data. They are structured for extraction by an NCAMS program such as XRT2.

Other tables 240 include for example ANMS sent 242 for airport noise monitoring system feed application as a cache table to mark the latest FDE sent to the ANMS client and OSTRIP sent 244 used by the XRT2 application as a cache table to mark the base. FDE sent to the OSTRIP file.

Figure 6:
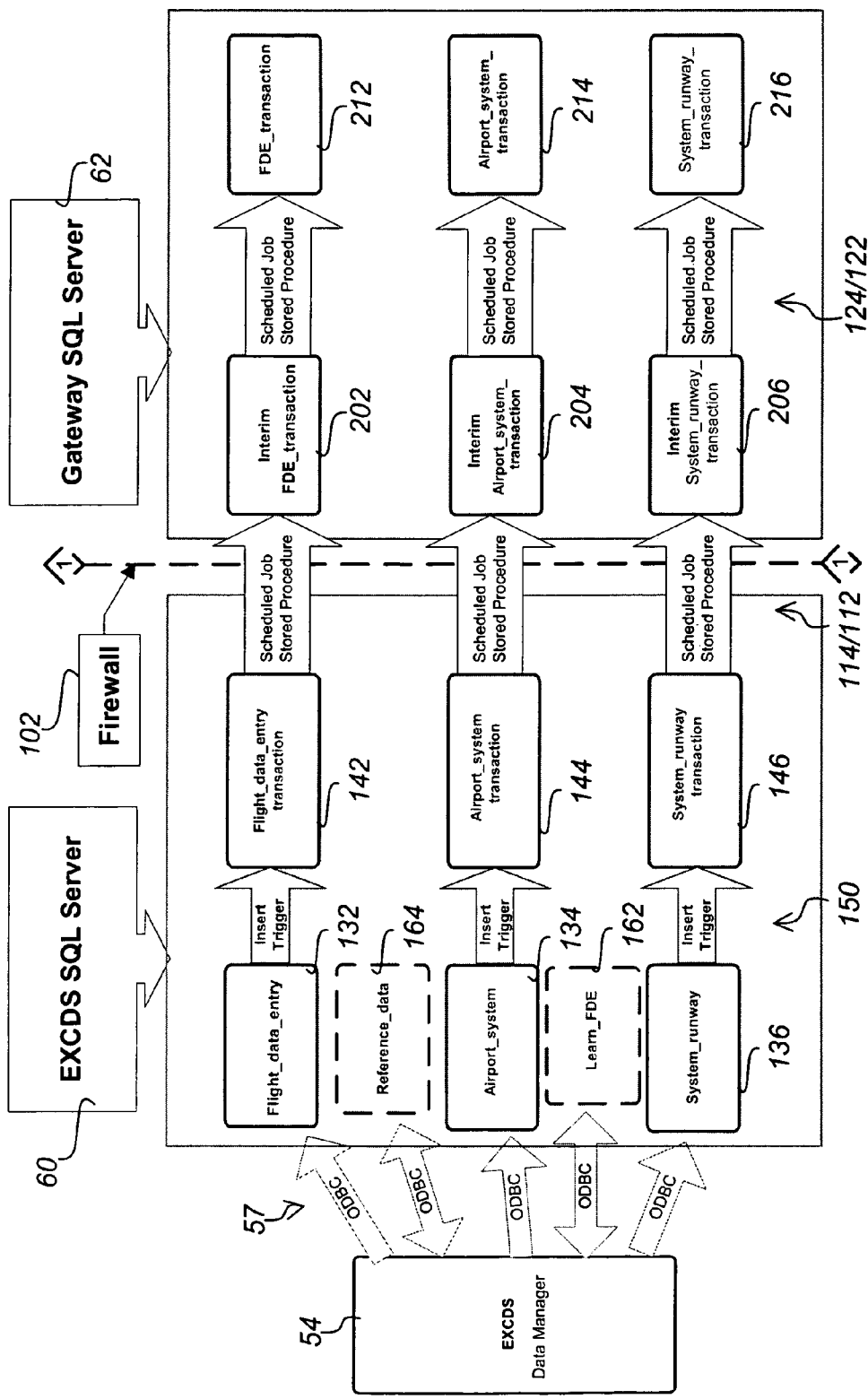
FIG. 6 illustrates in a functional block diagram, data movement between the data manager the EXCDS SQL Server and the Gateway SQL Server.

Referring to FIG. 6, there is illustrated in a functional block diagram, data movement between the data manager the EXCDS SQL Server and the Gateway SQL Server.

Jobs 114 are recurring tasks that SQL Server 60 can be programmed to perform. All Jobs 114 used in the EXCDS SQL Server 60 are included with releases of EXCDS software, so the DSC is not expected to build or configure Jobs. Maintaining jobs is the responsibility of maintenance technicians. However, if the DSC receives a report that the movements table is not being updated, he can inspect Jobs, and report any failures to maintenance.

Jobs 114 can use Stored Procedures 112 to carry out their tasks and each Job can include multiple steps. Placing Steps in a Job ensures that time sequence is enforced—i.e., one Step in a Job will not commence until the preceding one is finished.

EXCDS SQL Server 60 has Jobs 124 for:
  Stale data removal
  Database maintenance.
Gateway SQL Server has Jobs for:
  Stale data removal
  Database maintenance
  A task that transfers operational data from the EXCDS SQL Server 60 to itself.

When EXCDS is used for control and coordination, it collects data that is used to create local and itinerant movement records. Movement records are derived from actions performed by controllers, eliminating the need for NCAMS data entry.

The actual processing of movement data is done outside of the operational EXCDS system on the Gateway SQL server 62.

For each airport reporting local movements, the last local movement counter values for each hour are recorded in the local_movement table 232.

An itinerant movement is recorded in the movement table 234, for transactions that meet the following criteria:
  ACID is not null or empty
  Valid ATD and departure runway for departure airport (departure movement)
  Valid ATA and arrival runway for destination airport (arrival movement).

For arrival and departure (non-88) movements, at most one arrival and one departure per CFI is recorded. When multiple transactions qualify as movements, the latest (highest fde_id) transaction is used; any previous movement transactions for that CFI are deleted.

Multiple overflight (88) movements are recorded for a CFI providing the ATD/ATA are different by at least 1 minute. This allows the use of the same CFI for multiple overflight operations (traffic reporters, etc.).

The airport runway table 222 in the EXCDS database on the gateway SQL server 62 must contain all required runway codes (including 60, 70, and 99; 88 is built-in) for the airport(s) that are using EXCDS for movement reporting. A typical set is supplied when EXCDS is installed, and may be inspected and adjusted using SQL commands or stored procedures (see dsc_help).

Controls that transition arrival and departure FDEs between taxied and airborne states, and overflights through control zones, must set the ATD or ATA fields in order for a movement to be recorded. Controls that indicate multiple arrival and departure movements (overshoot, touch and go, stop and go) must create a new CFI by copying the selected FDE.

Tower procedures must assign the correct movement code (valid runway or 60/70/88/99) for all operations that require a movement record, and must use the appropriate controls to transition FDEs as discussed under Controls.

Local movements are recorded at adapted operational positions using controls that provide counters for single engine, multi engine, jet and military movement categories. The operational software maintains a copy of the local movement counters for each airport in the airport system table, and resets these counters to zero at the end of each hour. When a row is added or updated, a trigger copies the row to the airport system_transaction table.

Periodically airport_system_transaction rows are copied from the EXCDS operational SQL database 60 to the gateway SQL database 62. The new rows are scanned for movement data, as discussed under Business Rules. The actual processing is done by a stored procedure (sp_transfer local) that is run as part of a job under the control of the SQL Agent.

The EXCDS SQL database 60 maintains a copy of each FDE in the flight_data_entry table 132. When a FDE row is added or updated, a trigger 150 copies the row to the fde_transaction table 142.

Periodically FDE transaction rows are copied from the EXCDS operational SQL database 60 to the gateway SQL database 62. The new rows are scanned for movement data, as discussed under Business Rules. The actual processing is done by a stored procedure 122 (sp_transfer_synthesize) that is run as part of a job under the control of the SQL Agent.

EXCDS movement processing is designed to provide timely movement data, typically adapted at a resolution of 10 minutes. This precludes ignoring potential movement transactions until an end state (archived) transaction is detected, because this could cause a delay of several hours from the time a movement occurs until it is recorded.

The EXCDS operational software does not distinguish movements from other activities, and the system is typically adapted to meet operational rather than administrative requirements. As a result there may be multiple transactions representing potential movements from which actual movements are synthesized. An example is when an operational position issues take-off clearance and selects the "depart"-control on an FDE, thus recording a departure movement, but subsequently recalls the FDE from the airborne state (due to a rejected take-off, clearance cancelled, etc.). The movement, which was recorded, has not actually occurred, and is thus removed from the system. A movement will be recorded when the "depart" control is selected again.

The technique employed is to identify and record the latest available movement information for each flight during each processing period, and update or delete previous movement records as new transactions are received. Movement processing is described in further detail with regard to FIGS. 7 and 8.

Figure 7:
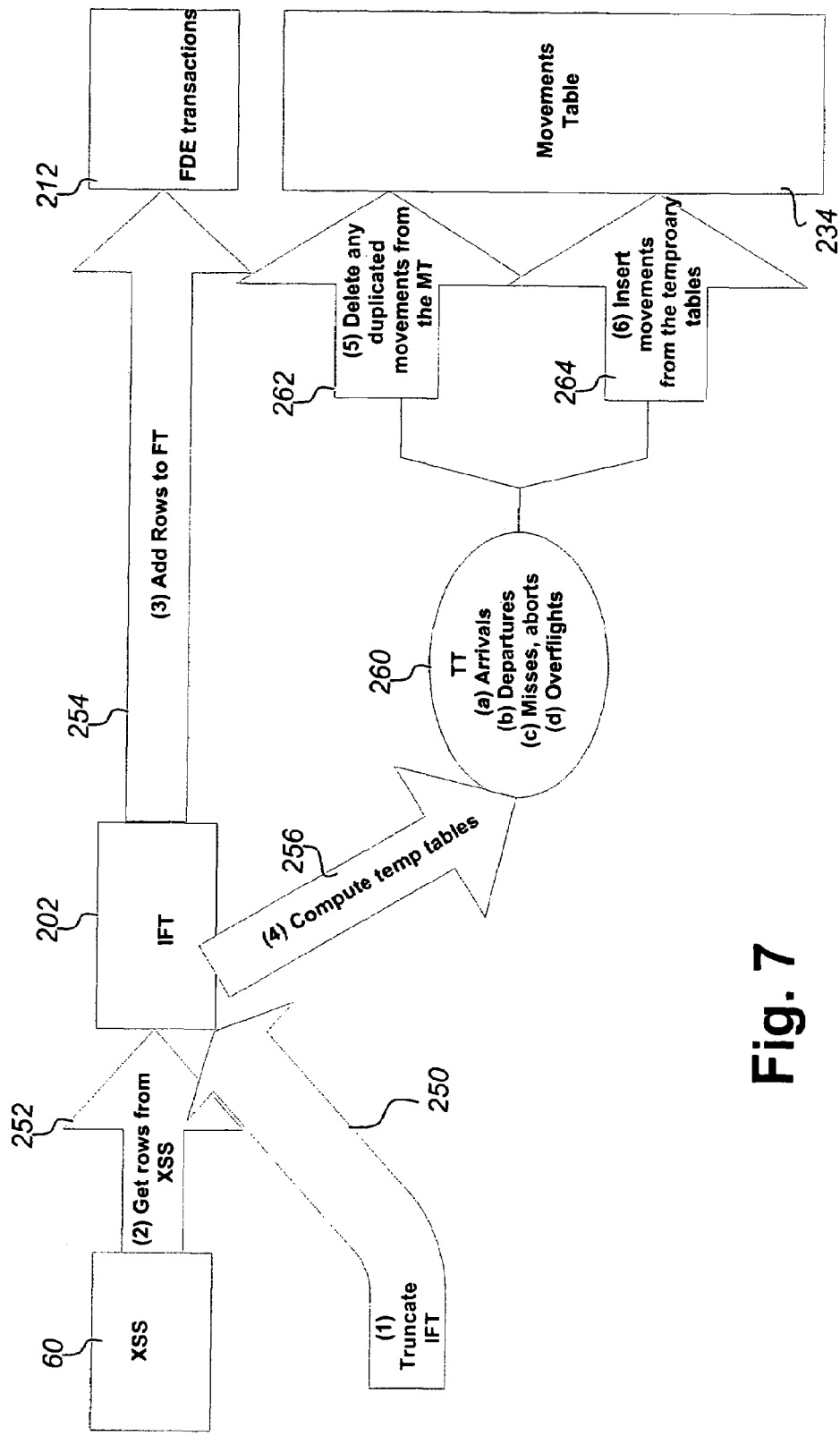
FIG. 7 illustrates in a functional block diagram, movement extraction process in the Gateway SQL Server.

Referring to FIG. 7 there is illustrated in a functional block diagram, movement extraction process in the Gateway SQL Server. The process begins at 250 with the truncation of the interim FDE transaction table 202. Then rows are obtained form the XSS 60 with get rows 252. Rows are then added to the permanent FDE transaction table 212. Computing temporary tables 256, where there are four temporary tables 260 for a) arrivals, b) departures, c) misses, aborts, and d) overflights. Once the temporary tables 260 are computed, any duplicated movements are deleted 262 from the movement table 234 and movements are inserted 264 from the temporary tables 260 into the movement table 234.

Figure 8:
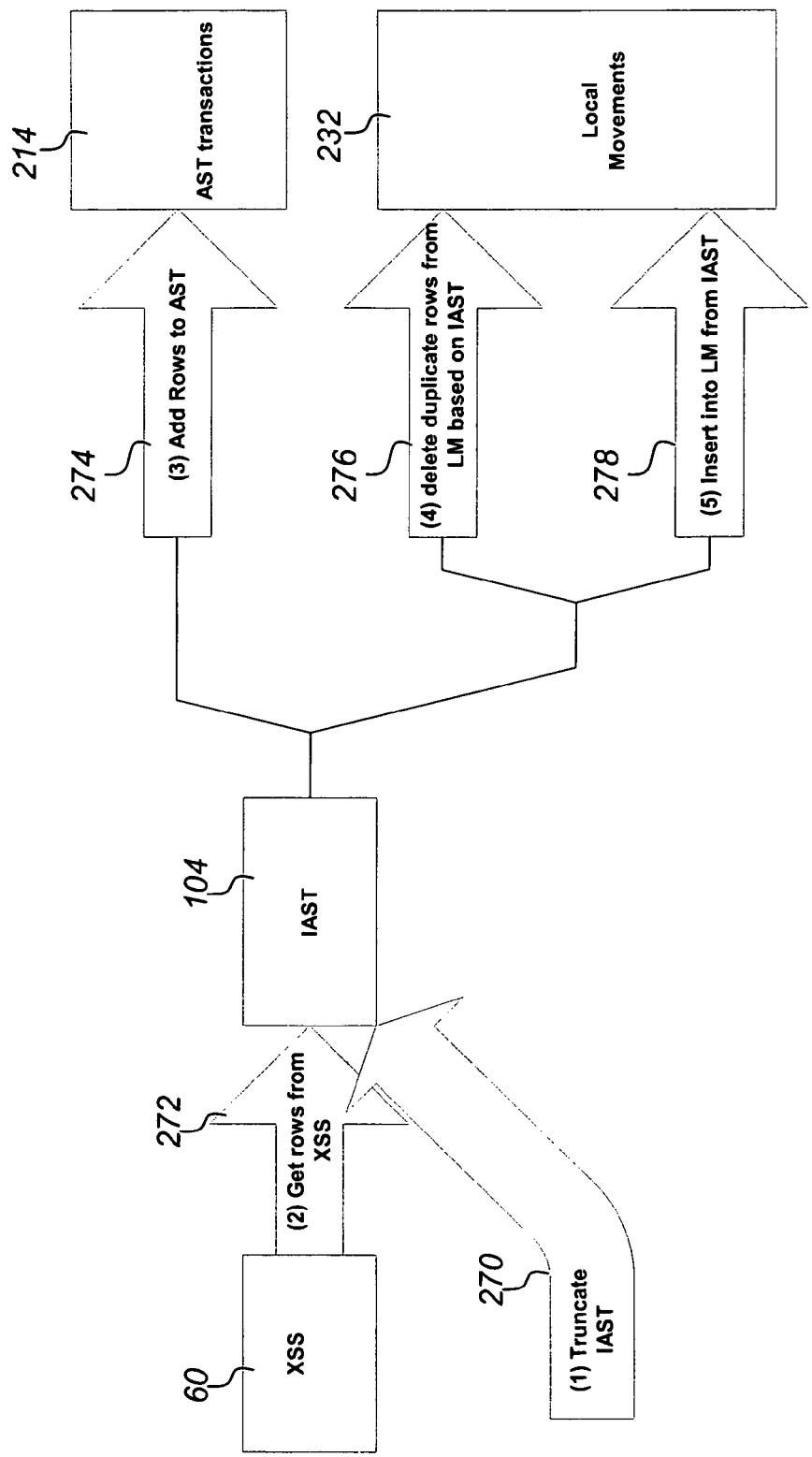
FIG. 8 illustrates in a functional block diagram, local movement extraction process in the Gateway SQL Server.

Referring to FIG. 8 there is illustrated in a functional block diagram, local movement extraction process in the Gateway SQL Server. The process begins at 270 with the truncation of the interim airport system transaction table 204. Then rows are obtained form the XSS 60 with get rows 272. Rows are then added to the interim airport system transaction (IAST) table 204. This is followed by adding rows to the permanent airport system transaction table 214; deleting 276 any duplicated rows from the movement table 232 and inserting 278 from the IAST table 204 into the local movements table 232.

Jobs are recurring tasks that SQL Server can be programmed to perform. All Jobs used in the EXCDS SQL Server are included with releases of EXCDS software, so the DSC is not expected to build or configure Jobs. Maintaining jobs is the responsibility of Maintenance technicians. However, if the DSC receives a report that the movements table is not being updated, he can inspect Jobs, and report any failures to Maintenance. Jobs can use Stored Procedures to carry out their tasks and each Job can include multiple steps. Placing Steps in a Job ensures that time sequence is enforced—i.e., one Step in a Job will not commence until the preceding one is finished.

EXCDS SQL Server has a Job for:
  Stale data removal
  Database maintenance.

Gateway SQL Server has Jobs for:
  Stale data removal
  Database maintenance
  A task that transfers operational data from the EXCDS SQL Server to itself.

The dsc_help Stored Procedure is used to provide the DSC with a quick reference on the use of each of the dsc_trace Stored Procedures. The output of dsc_help provides the DSC with the following concise listing of all the dsc_trace Stored Procedures, as well as the syntax required to run them. The output is shown in FIG. 9.

The dsc_trace2 Stored Procedure is used to return all entries (or rows) in the fde_transaction table for a particular aircraft identification that occurred during a specified time period. The parameters are:
  An Aircraft Identification (compulsory).
  A start time (optional). Default value is four hours previous.
  An end time (optional). Default value is present time.
  The output is shown in Table B.

TABLE B

Output of Stored Procedure dsc_trace2

| Column name | Description |
| --- | --- |
| CFI-ACID | Combination of the Current Flight plan Index (CFI) and Aircraft Identification |
| State/Magic Bits | State and Magic Bits |
| Update Time | The time this change was inserted into the database |
| Update Machine | The network name of the workstation where this change was made |
| SSR | Transponder code |
| DEPT | Departure Airport |
| ATD | Actual Time of Departure |
| D_RWY | Departure Runway |
| DEST | Destination Airport |
| ATA | Actual Time of Arrival |
| A_RWY | Arrival Runway |
| Proposed | Estimated Time of Departure |
| FPUI | Flight Plan Unique Identifier used for Pre-departure clearance (PDC) |
| VAL | The Validation status of this FDE |
| Fde_id | Unique identifier for this data row |
| NFDPS_FIX_ROUTE | Nfdps fix route |

The dsc_trace3 Stored Procedure is used to extract all entries in the fde_transaction table for a particular time period, as specified by a start time and end time supplied by the DSC. There are two optional parameters that can be passed to this Stored Procedure:
  A start time (optional). Default value is four hours previous.
  An end time (optional). Default value is present time.

If the start and end times are not supplied, default values are applied by the Stored Procedure to retrieve the transactions that have occurred in the last hour. If more than one parameter is passed to a Stored Procedure, each parameter must be separated from the next one by a comma.

Running the dsc_trace3 Stored Procedure returns the following columns for each row retrieved from the fde_transaction table in the EXCDS database.

TABLE C

Output of Stored Procedure dsc_trace3

| Column name | Description |
| --- | --- |
| CFI-ACID | Combination of the CFI and Aircraft Identification |
| State/Magic Bits | State and Magic Bits |
| Update Time | The time this change was inserted into the database |
| Update Machine | The network name of the workstation where this change was made |
| SSR | Transponder code |
| DEPT | Departure Airport |
| ATD | Actual Time of Departure |
| D_RWY | Departure Runway |
| DEST | Destination Airport |
| ATA | Actual Time of Arrival |
| A_RWY | Arrival Runway |
| Proposed | Estimated Time of Departure |
| FPUI | Flight Plan Unique Identifier used for PDC |
| Fde_id | Unique identifier for this data row |

The dsc_trace4 Stored Procedure is used to extract all entries in the fde_transaction table that were initiated from a particular workstation. For example the workstation is usually associated with a control position. The dsc_trace4 procedure usually traces events or entries that occurred during a specified time period, although this is optional.

The parameters are:

Workstation name (compulsory)

A start time (optional). Default value is four hours previous.

An end time (optional). Default value is present time.

Output for dsc_trace4 is shown in Table D

TABLE D

Output of Stored Procedure dsc_trace4

| Column name | Description |
| --- | --- |
| Update Time | The time this change was inserted into the database |
| Update Machine | The network name of the workstation where this change was made |
| ACID | Aircraft Identification |
| SSR | Transponder code |
| State/Magic Bits | State and Magic Bits |
| DEPT | Departure Airport |
| ATD | Actual Time of Departure |
| D_RWY | Departure Runway |
| DEST | Destination Airport |
| ATA | Actual Time of Arrival |
| A_RWY | Arrival Runway |
| Clx | Landing Clearance Indicator |
| FPUI | Flight Plan Unique Identifier used for PDC |
| VAL | The Validation status of this FDE |
| NFDPS_FIX_ROUTE | Nfdps fix route |

The dsc_trace5 Stored Procedure extracts all entries in the fde_transaction table for a particular aircraft identification that occurred during a specified period (optional). This Stored Procedure is similar to the Dsc_trace2 Stored Procedure, but it returns different data columns. This Stored Procedure is tuned to return values for transactions that would likely take place in the Control Tower, as opposed to the Terminal.

The parameters are:

An Aircraft Identification (compulsory).

A start time (optional). Default value is four hours previous.

An end time (optional). Default value is present time.

The output of dsc_trace5 is shown in Table E.

TABLE E

Output of Stored Procedure dsc_trace5

| Column name | Description |
| --- | --- |
| Update Time | The time this change was inserted into the database |
| ACID | Aircraft Identification |
| SSR | Transponder code |
| State/Magic Bits | State and Magic Bits |
| DEPT | Departure Airport |
| ATD | Actual Time of Departure |
| D_RWY | Departure Runway |
| DEST | Destination Airport |
| ATA | Actual Time of Arrival |
| A_RWY | Arrival Runway |
| Clx | Landing Clearance Indicator |
| FPUI | Flight Plan Unique Identifier used for PDC |
| VAL | The Validation status of this FDE |
| Update Machine | The network name of the workstation where this change was made |

The Dsc_movement Stored Procedure is used to extract entries in the movement table. The following lists the parameters for this stored procedure (all optional):

ACID

TYPE

Departure airport

Destination airport

Actual time of departure start

Actual time of departure end

Actual time of arrival start

Actual time of arrival end

Departure runway

Arrival runway

Flight rules

Magic Bits.

If no parameters are supplied, this Stored Procedure will return all the arrival and departure rows in the movement table for the last 2 days. Running the dsc_movement Stored Procedure will return the following columns for each row retrieved from the movement table as shown in Table F.

TABLE F

Output of Stored Procedure dsc_movement

| Column name | Description |
| --- | --- |
| ACID | Aircraft Identification |
| W | Weight category |
| Type | Aircraft type |
| E | Equipment |
| I/V | Flight rules |
| Dept | Departure airport |
| DepRwy | Departure Runway |
| ATD | Actual Time of Departure |
| Dest | Destination Airport |
| ArrRwy | Arrival Runway |

TABLE F-continued

Output of Stored Procedure dsc_movement

| Column name | Description |
|---|---|
| ATA | Actual Time of Arrival |
| CFI | Current Flight Identifier |
| Magic bits | Magic Bits |

Aircraft movement reporting and adaptation considerations for EXCDS3 are now described.

In operation, when EXCDS is used for control and coordination, it collects data that is used to create local and itinerant movement records. Movement records are derived from actions performed by controllers, eliminating the need for NCAMS data entry. The actual processing of movement data is done outside of the operational EXCDS system on the Gateway SQL server 62.

For each airport reporting local movements, the last local movement counter values for each hour are recorded in the local_movement table.

An itinerant movement is recorded in the movement table, for transactions that meet the following criteria:
  ACID is not null or empty
  Valid ATD and departure runway for departure airport (departure movement)
  Valid ATA and arrival runway for destination airport (arrival movement).

For arrival and departure (non-88) movements, at most one arrival and one departure per CFI is recorded. When multiple transactions qualify as movements, the latest (highest fde_id) transaction is used; any previous movement transactions for that CFI are deleted. Multiple overflight (88) movements are recorded for a CFI providing the ATD/ATA are different by at least 1 minute. This allows the use of the same CFI for multiple overflight operations (traffic reporters, etc.).

The airport_runway table in the EXCDS database on the gateway SQL server 62 must contain all required runway codes (including 60, 70, and 99; 88 is built-in) for the airport(s) that are using EXCDS for movement reporting. A typical set is supplied when EXCDS is installed, and may be inspected and adjusted using SQL commands or stored procedures (see dsc_help).

Controls that transition arrival and departure FDEs between taxied and airborne states, and overflights through control zones, must set the ATD or ATA fields in order for a movement to be recorded. Controls that indicate multiple arrival and departure movements (overshoot, touch and go, stop and go) must create a new CFI by copying the selected FDE.

Tower procedures must assign the correct movement code (valid runway or 60/70/88/99) for all operations that require a movement record, and must use the appropriate controls to transition FDEs as discussed under Controls.

Local movements are recorded at adapted operational positions, using controls that provide counters for single engine, multi engine, jet and military movement categories. The operational software maintains a copy of the local movement counters for each airport in the airport_system table, and resets these counters to zero at the end of each hour. When a row is added or updated, a trigger copies the row to the airport_system_transaction table.

Periodically airport_system_transaction rows are copied from the EXCDS operational SQL database to the gateway SQL database. The new rows are scanned for movement data, as discussed under Business Rules. The actual processing is done by a stored procedure (sp_transfer_local) that is run as part of a job under the control of the SQL Agent.

The EXCDS SQL database maintains a copy of each FDE in the flight_data_entry table. When a FDE row is added or updated, a trigger copies the row to the fde_transaction table. Periodically FDE transaction rows are copied from the EXCDS operational SQL database to the gateway SQL database. The new rows are scanned for movement data, as discussed under Business Rules. The actual processing is done by a stored procedure (sp_transfer_synthesize) that is run as part of a job under the control of the SQL Agent.

EXCDS movement processing is designed to provide timely movement data, typically adapted at a resolution of 10 minutes. This precludes ignoring potential movement transactions until an end state (archived) transaction is detected, because this could cause a delay of several hours from the time a movement occurs until it is recorded.

The EXCDS operational software does not distinguish movements from other activities, and the system is typically adapted to meet operational rather than administrative requirements. As a result there may be multiple transactions representing potential movements from which actual movements are synthesized. An example is when an operational position issues take-off clearance and selects the "depart" control on an FDE, thus recording a departure movement, but subsequently recalls the FDE from the airborne state (due to a rejected take-off, clearance cancelled, etc.). The movement, which was recorded, has not actually occurred, and is thus removed from the system. A movement will be recorded when the "depart" control is selected again.

The technique employed is to identify and record the latest available movement information for each flight during each processing period, and update or delete previous movement records as new transactions are received.

There are sixteen stored procedures in the GSS. Seven of these stored procedures are in support of DSC queries. Three are administrative in nature. Three support housekeeping activities, and three support transfer and movement processing.

DSC support queries are run from the query analyzer, and support the Data Systems Coordinator when attempting to trace FDEs throughout the EXCDS system.

DSC Help

This stored procedure will simply display the available help queries, and the required or optional parameters of each. This may display changes or additions to the baseline set of help queries below. Sample output is shown in FIG. 9.

DSC Movement

This query, when run, will take almost any parameter and display data relevant to that parameter extracted from the movement table. For example, if the user were to type "DSC_MOVEMENT ACA111", the query would display any rows in the movement table with an ACID of "ACA111". Any parameter in the movement table can be used. The ACID must be used immediately after the 'sp' invocation.

DSC Tables

This query will display how many rows are present in each table in the GSS EXCDS database.

DSC Trace2

This query displays transactions based upon an ACID for a specified period.

DSC Trace3

This query displays all transactions for a specified period.

DSC Trace4

This query displays tower activity for a specified machine and period.

DSC Trace5

This query displays tower activity for a specified acid and period.

Administrative Queries

SP_CREATE_NEW_EXCDS_USER

This stored procedure adds additional logins for the GSS, and adds the users to the EXCDS database. The procedure takes 2 parameters:
the user name to be added
the password associated with the new user name.

It is intended to be executed on an as needed basis.

SP_DROP_EXCDS_USER

This stored procedure simply deletes a user from the EXCDS database, and also deletes the login associated with that user. It takes the user name as a parameter. It is intended to be used in an adhoc manner.

SP_EXCDS_CONNECTION_CHECK

This stored procedure simply returns a literal value of 1, to verify that the EXCDS database is installed and available. The procedure takes no parameters, and is intended to be run by a SQL scheduled job.

Housekeeping Queries

SP_DELETE_OLD_FDE_TRANSACTION

This stored procedure deletes rows in the FDE transaction table if they are more than 45 days old. It takes no parameters. It is intended to be invoked by a SQL server task.

SP_DELETE_STALE_AIRPORT_TRANSACTION

This stored procedure deletes rows in the airport system transaction table if they are more than 45 days old. It takes no parameters. It is intended to be invoked by a SQL server task.

SP_DELETE_STALE_SYSTEM_RUNWAY_ TRANSACTION

This stored procedure deletes rows in the system runway transaction table if they are more than 45 days old. It takes no parameters. It is intended to be invoked by a SQL server task.

Transfer and Movement Processing Queries
SP_TRANSFER_LOCAL

This stored procedure moves data across the firewall into the GSS, and inserts data into the airport system transaction table. It also processes and records local movements in the local movement table. It is intended to be invoked by a SQL Server automated job.

SP_TRANSFER_SYNTHESIZE

This stored procedure moves data across the firewall into the GSS, and inserts data into the FDE transaction table. It also process movements and inserts them into the movements table. It is intended to be invoked by a SQL Server automated job. A maximum rowcount can be set as a parameter.

SP_TRANSFER_SYSTEM_RUNWAY

This stored procedure moves data from the XSS to the GSS, and inserts it into the system runway transaction table. It is intended to be invoked by a SQL Server automated job.

There are two views used in the GSS: NCAMS view and local movement view.
The NCAMS view presents the movement table in an NCAMS format. The NCAMS format for local movements lists rows that have entries.
The Local Movement view presents the local movement table in NCAMS format.

There are three automated jobs that run in the GSS: transfer and movements 0000-0850, transfer and movements 1000-2359 and database delete stale data and maintenance.

Transfer & Movements 0000-0850 task is used to transfer rows from the XSS into the 3 transaction tables, and to extract data from those transaction tables into the movement and local movements table. This job executes between the hours of 0000 and 0850 Zulu time. The job is set up to fail if a previous step fails.
The transfer rows and synthesize movements step runs the stored procedure sp_transfer synthesize. This moves data from the flight_data entry_transaction table on the XSS to the FDE_transaction table on the GSS. From there it extracts all relevant movements and inserts them into the movement table.
The transfer local step runs the stored procedure sp_transfer_local. This moves data from the airport system transaction table on the XSS to the same table on the GSS, and extracts local movements in to the local movement table.
The transfer system runway step runs the stored procedure sp_transfer_system_runway, which moves data from the XSS to the GSS straight across.

Transfer & Movements 1000-2359 task is used to transfer_rows from the XSS into the 3 transaction tables, and to extract data from those transaction tables into the movement_and local movements table. This job executes between the hours of 1000 and 2359. The job is set up to fail if a previous step fails.
The transfer rows and synthesize movements step runs the stored procedure sp_transfer_synthesize. This moves data from the flight_data_entry_transaction table on the XSS to the FDE_transaction table on the GSS. From there it extracts all relevant movements and inserts them into the movement table.
The transfer local step runs the stored procedure sp_transfer_local. This moves data from the airport system transaction table on the XSS to the same table on the GSS, and extracts local movements in to the local movement table.
The transfer system runway step runs the stored procedure sp_transfer_system_runway, which moves data from the XSS to the GSS straight across.

Database delete stale data and maintenance have two main purposes of scheduled tasks for the GSS:
Deleting Old Data: If data is not deleted, the GSS database will eventually fill up completely and cease to function.
Periodic Maintenance: The constant updating, inserting and deleting of rows requires that periodic maintenance be performed. This is much like the defragmentation process performed on hard disks.

GSS has one main automated task called "database delete stale data and maintenance". This is run everyday at 0900Z. SQL Server Agent performs one scheduled job in the GSS. This job consists of seven steps, which are performed periodically. The job is set up to fail if a previous step fails. Subsequent steps will also fail to run. The seven steps are detailed below:

RUN "SP_DELETE_OLD_FDE_TRANSACTION"

This step runs the named stored procedure. It deletes stale data from the fde_transaction table. The data must be older than 45 days old. This keeps the table trimmed to the minimum possible size that is allowable.

RUN "SP_DELETE_STALE_SYSTEM_RUNWAY_TRANSACTION"

This step runs the named stored procedure. It deletes stale data from the system_runway_transaction table. The data must be older than 45 days old. This keeps the SRT table in check.

RUN "SP_DELETE_STALE_AIRPORT_SYSTEM_TRANSACTIONS"

This step runs the named stored procedure. It deletes stale data from the AST table. The data must be older than 45 days old. This keeps the AST table in check.

RUN DBCC CHECKDB EXCDS

This step runs the powerful SQL Server DBCC checkdb command on the entire EXCDS database. DBCC checkdb catches and repairs the widest possible set of database errors, including allocation or linkage errors and validating integrity.

Run "Update Statistics" On All Operational Data Tables

This step re-computes all statistics on key values used for query optimization. SQL Server will execute a query plan based upon distribution of data. If the statistics on key values are not kept up-to-date, the query plan may become out-of-date, which may result in much longer execution times. Statistics become out-of-date when a large percentage of data is inserted, updated or deleted.

Run Recompile All Triggers and Stored Procedures

The execution of triggers and stored procedures, like statistics, are based upon query plans. The query plans are based upon distribution of data when the server is first started, or when they are first compiled. In order to keep the query plans up-to-date, it is necessary to manually recompile these items when a large percentage of data is moved about on a daily basis.

Numerous modifications, variations and adaptations may be made to the particular embodiments of the present invention described above without departing from the scope of the invention as defined in the claims.

What is claimed is:

1. A database architecture for an air traffic information display system comprising:
   an air traffic control system in a secured domain, including:
      a data manager including a first interface; and
      a first SQL database server connected to the data manager via the first interface for receiving operating data from the data manager;
   a business system outside the air control system, including:
      a second SQL database server including a stored procedure for sending a request for updating to the first SQL database server and copying the operating data from the first SQL database server based on the request to allow a user of the business system to use the operating data in the second SQL database server, and
   a secured network including a data transfer link between the first SQL database server and the second SQL database server and a firewall for access control to the first SQL database server and the second SQL database serve for exclusively implementing a one-way transfer of the operating data from the first SQL database server to the second SQL database server using the stored procedure to prevent the data in the first SQL database server from being corrupted by the user of the business system.

2. A system as claimed in claim 1 wherein the first SQL, database server includes first tables for current data and second tables for logging changes to the current data, and wherein the changes are transferred to the second SQL database server using the stored procedure.

3. A system as claimed in claim 2 wherein the first tables include a flight data table.

4. A system as claimed in claim 2 wherein the first tables include an airport system table.

5. A system as claimed in claim 2 wherein the first tables include a system table associated with air navigation.

6. A system as claimed in claim 2 wherein the second tables include a flight data table.

7. A system as claimed in claim 2 wherein the second tables include an airport system table.

8. A system as claimed in claim 2 wherein the second tables include a system table associated with air navigation.

9. A system as claimed in claim 1 wherein the first interface is an Open Database Connectivity (ODBC).

10. A system as claimed in claim 1 wherein the second SQL database server includes third tables for receiving updates from the second tables.

11. A system as claimed in claim 10 wherein the second SQL database server includes fourth tables for logging copies of the third tables.

12. A system as claimed in claim 11 wherein the second SQL database server includes fifth tables for storing movements.

13. A system as claimed in claim 12 wherein the second SQL database server includes a module for calculating movements in dependence upon changes in the third tables.

14. A method of storing air traffic information, the method comprising:
   receiving a data update request;
   changing operating data in accordance with the request;
   storing the changed operating data in a first SQL database server in a secured air traffic control system; and
   exclusively implementing a one-way transfer of the operating data from the first SQL database server to a second SQL database server in a business system through a secured network using a stored procedure in the second SQL database server to prevent the changed data in the first SQL database server from being corrupted by a user of the business system, including:
      sending a request for updating from the second SQL database server to the first SQL database server through the secured network, the second SQL database server being in the business system outside the secured air traffic control system; and
      copying the operating data from the first SQL database server to the second SQL database server across the secured network to allow the user of the business system to use the operating data in the second SQL database server.

15. A method as claimed in claim 14 wherein the storing includes storing the changed data in first tables.

16. A method as claimed in claim 14 wherein the storing includes storing a log of data change transactions in second tables.

17. A method as claimed in claim 15 wherein the first tables include a flight data table.

18. A method as claimed in claim 15 wherein the first tables include an airport system table.

19. A method as claimed in claim 15 wherein the first tables include a system table associated with air navigation.

20. A method as claimed in claim 16 wherein the second tables include a flight data table.

21. A method as claimed in claim 16 wherein the second tables include an airport system table.

22. A method as claimed in claim 16 wherein the second tables include a system table associated with air navigation.

23. A method as claimed in claim 14 wherein the copying includes storing updates from the second tables in third tables.

24. A method as claimed in claim 14 wherein the copying includes logging copies of the third tables in fourth tables.

25. A method as claimed in claim 14 wherein the copying includes calculating movements in dependence upon changes in the third tables.

26. A method as claimed in claim 25 wherein the calculating includes storing movements in fifth tables.

27. A system as claimed in claim 1, wherein the first SQL database server includes at least a first table and a second table, the database manager operating on the first table, the second table being populated by a trigger associated with the first table, and wherein one or more than one row associated with one or more changes to the first table is inserted into the second table when the one or more changes are made to the first table.

28. A system as claimed in claim 1 wherein the stored procedure is run by a scheduled job by which the one-way transfer of the data is implemented periodically.

29. A method as claimed in claim 14 wherein the storing includes storing the changed data into a first table in the first SQL database server, and populating a second table in the first SQL database server to insert one or more than one row associated with the change into the second table.

30. A method as claimed in claim 14 wherein the implementing includes running the stored procedure by a scheduled job to periodically implement the one-way transfer of the changed data.

31. A method as claimed in claim 14 wherein the storing includes denormalizing tables in the first SQL database server.

32. A method as claimed in claim 14, wherein the copying comprises initiating a data pull by the second SQL database server.

33. A method as claimed in claim 26, wherein the calculating includes deleting any duplicated movements from the fifth tables.

34. A method as claimed in claim 33, wherein the data transfer is periodically implemented by the stored procedure, and wherein the calculating is implemented by the stored procedure when the data is transferred from the first SQL database server to the second SQL database server.

35. A method as claimed in claim 33, wherein the data transfer is periodically implemented by the stored procedure, and wherein the calculating comprises extracting and synthesizing the movement associated with an aircraft when the data is transferred from the first SQL database server to the second SQL database server.

36. A method as claimed in claim 14, wherein the copying includes denormalizing tables in the first SQL database server.

37. A system as claimed in claim 27, wherein data in the first table is duplicated in the second table to remove dependencies on each other.

* * * * *